(12) United States Patent
Rosen et al.

(10) Patent No.: US 7,027,769 B1
(45) Date of Patent: Apr. 11, 2006

(54) GEO STATIONARY COMMUNICATIONS SYSTEM WITH MINIMAL DELAY

(75) Inventors: Harold A. Rosen, Santa Monica, CA (US); Donald C. D. Chang, Thousand Oaks, CA (US); Ming U. Chang, Rancho Palos Verdes, CA (US); Weizheng Wang, Rancho Palos Verdes, CA (US); John I. Novak, III, West Hills, CA (US); Wah L. Lim, Santa Ana, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 461 days.

(21) Appl. No.: 09/721,854

(22) Filed: Nov. 22, 2000

Related U.S. Application Data

(63) Continuation-in-part of application No. 09/539,964, filed on Mar. 31, 2000.

(51) Int. Cl.
*H04B 7/15* (2006.01)

(52) U.S. Cl. ............. 455/11.1; 455/431; 455/427; 455/13.1

(58) Field of Classification Search ........... 455/431, 455/427, 12.1, 11.1, 13.1, 422; 370/310, 370/321; 342/361, 352
See application file for complete search history.

(56) References Cited

U.S. PATENT DOCUMENTS

| | | | | |
|---|---|---|---|---|
| 2,598,064 A | * | 5/1952 | Lindenblad | 455/11.1 |
| 2,748,266 A | * | 5/1956 | Boyd | 455/431 |
| 3,993,997 A | * | 11/1976 | Jackson | 455/13.1 |
| 4,635,063 A | | 1/1987 | Chang et al. | 342/380 |
| 4,797,677 A | * | 1/1989 | MacDoran et al. | 342/352 |
| 4,897,661 A | | 1/1990 | Hiraiwa | |
| 5,017,927 A | | 5/1991 | Agrawal et al. | 342/371 |
| 5,077,562 A | | 12/1991 | Chang et al. | 342/368 |
| 5,218,619 A | | 6/1993 | Dent | 375/1 |
| 5,550,809 A | | 8/1996 | Bottomley et al. | 370/18 |
| 5,555,257 A | | 9/1996 | Dent | 370/95.1 |
| 5,572,216 A | | 11/1996 | Weinberg et al. | 342/357 |
| 5,584,047 A | | 12/1996 | Tuck | |
| 5,589,834 A | | 12/1996 | Weinberg et al. | |

(Continued)

FOREIGN PATENT DOCUMENTS

EP     1 139 583 A2     10/2001

(Continued)

OTHER PUBLICATIONS

Oodo M. et. Al, "Onboard DBF Antenna For Stratospheric Platform", 2000 IEEE International Conference on Phased Array Systems and Technology, Proceedings, May 21-25, 2000, pp. 125-128.

(Continued)

*Primary Examiner*—Lana Le
(74) *Attorney, Agent, or Firm*—Georgann S. Grunebach

(57) ABSTRACT

A method for communicating and a communications system apparatus are disclosed. The apparatus comprises a communications platform and a gateway communicatively coupleable with a terrestrially-based network. The communications platform is disposed in a stratospheric location and transponds information between at least one of a plurality of user terminals and the gateway in essentially a bent pipe fashion. The method comprises the steps of receiving a first signal from the user terminal having an antenna in a stratospherically-based communication platform that maintains an apparent position relative to the user terminal within a beamwidth of a user terminal antenna and transponding the first signal from the stratospherically based communications platform to a gateway ground station.

48 Claims, 5 Drawing Sheets

U.S. PATENT DOCUMENTS

| | | | |
|---|---|---|---|
| 5,594,941 A | 1/1997 | Dent | 455/13.4 |
| 5,612,701 A | 3/1997 | Diekelman | 342/354 |
| 5,790,070 A | 8/1998 | Natarajan et al. | |
| 5,810,284 A | 9/1998 | Hibbs et al. | 244/13 |
| 5,825,325 A | 10/1998 | O'Donovan et al. | |
| 5,852,721 A | 12/1998 | Dillon et al. | |
| 5,856,804 A | 1/1999 | Turcotte et al. | 342/371 |
| 5,862,480 A | 1/1999 | Wild et al. | |
| 5,864,579 A | 1/1999 | Briskman | |
| 5,867,109 A | 2/1999 | Wiedeman | |
| 5,878,034 A | 3/1999 | Hershey et al. | 370/321 |
| 5,903,549 A | 5/1999 | Von der Embse et al. | 370/310 |
| 5,909,460 A | 6/1999 | Dent | |
| 5,917,447 A | 6/1999 | Wang et al. | 342/383 |
| 5,918,157 A | 6/1999 | Wiedeman et al. | |
| 5,946,625 A | 8/1999 | Hassan et al. | |
| 5,949,766 A | 9/1999 | Ibanez-Meier et al. | |
| 5,963,862 A | 10/1999 | Adiwoso et al. | |
| 5,973,647 A | 10/1999 | Barrett et al. | 342/713 |
| 5,974,317 A | 10/1999 | Djuknic et al. | 455/431 |
| 6,020,845 A | 2/2000 | Weinberg et al. | |
| 6,028,884 A | 2/2000 | Silberger et al. | |
| 6,032,041 A | 2/2000 | Wainfan et al. | |
| 6,061,562 A | 5/2000 | Martin et al. | 455/431 |
| 6,067,442 A | 5/2000 | Wiedeman et al. | |
| 6,067,453 A | 5/2000 | Adiwoso et al. | |
| 6,085,078 A | 7/2000 | Stamegna | |
| 6,104,911 A | 8/2000 | Diekelman | |
| 6,111,542 A | 8/2000 | Day et al. | 342/359 |
| 6,118,824 A | 9/2000 | Smith et al. | |
| 6,147,658 A | 11/2000 | Higashi | 343/853 |
| 6,151,308 A | 11/2000 | Ibanez-Meier et al. | 370/316 |
| 6,160,994 A | 12/2000 | Wiedeman | |
| 6,167,263 A | 12/2000 | Campbell | 455/431 |
| 6,176,451 B1 | 1/2001 | Drymon | 244/3.14 |
| 6,195,555 B1 | 2/2001 | Dent | |
| 6,201,797 B1 | 3/2001 | Leuca et al. | |
| 6,205,320 B1 | 3/2001 | Coleman | |
| 6,215,776 B1 | 4/2001 | Chao | |
| 6,308,045 B1 | 10/2001 | Wright et al. | |
| 6,324,398 B1 | 11/2001 | Lanzerotti et al. | 455/431 |
| 6,343,205 B1 | 1/2002 | Threadgill et al. | |
| 6,374,080 B1 | 4/2002 | Uchida | |
| 6,380,893 B1 | 4/2002 | Chang et al. | |
| 6,388,615 B1 | 5/2002 | Chang et al. | 342/368 |
| 6,397,078 B1 | 5/2002 | Kim | |
| 6,400,925 B1 | 6/2002 | Tirabassi et al. | |
| 6,408,180 B1 | 6/2002 | McKenna et al. | |
| 6,438,379 B1 | 8/2002 | Gitlin et al. | |
| 6,507,739 B1 | 1/2003 | Gross et al. | |
| 6,567,052 B1 | 5/2003 | Wang et al. | |
| 6,628,941 B1 * | 9/2003 | Knoblach et al. | 455/431 |
| 2001/0038342 A1 | 11/2001 | Foote | |
| 2002/0041575 A1 | 4/2002 | Karabinis et al. | |
| 2002/0072361 A1 | 6/2002 | Knoblach et al. | |
| 2002/0126042 A1 | 9/2002 | Chang et al. | |

FOREIGN PATENT DOCUMENTS

| | | |
|---|---|---|
| EP | 1 148 662 A2 | 10/2001 |
| EP | 1 152 552 A2 | 11/2001 |
| EP | 1 158 698 A2 | 11/2001 |
| WO | WO 95/04407 | 2/1995 |
| WO | WO 96/22661 | 7/1996 |
| WO | WO 97 07609 A | 2/1997 |
| WO | WO 98 51568 A | 11/1998 |
| WO | WO 99/13598 | 3/1999 |
| WO | WO 99 13598 A | 3/1999 |
| WO | WO 99/23769 | 5/1999 |
| WO | WO 99 23769 A | 5/1999 |
| WO | WO 00/14902 | 3/2000 |
| WO | WO 01/93458 A2 | 12/2001 |
| WO | WO 01/95523 A2 | 12/2001 |

OTHER PUBLICATIONS

Colella N J et al., "The HALO Network ™", IEEE Communications Magazine, IEEE Service Center, Piscataway, N.J. U.S., vol. 38, No. 6, Jun. 2000, pp. 142-148, XP 000932657, ISSN: 0163-6804.

Colella, Nicholas J. et al., "High-Speed Internet Access via Stratospheric HALO Aircraft", INET 99 Proceedings, Internet Society, Technology/ Wireless, 13 pages, Jun. 8, 1999.

U.S. Appl. No. 09/539,964, filed Mar. 31, 2000, H. Rosen, et al.

U.S. Appl. No. 09/615,894, filed Jul. 14, 2000, D. C. D. Chang et al.

Colella, Nicholas J. et al., "The HALO Network™" IEEE Communications Magazine, Jun. 2000, pp. 142-148.

Suzuki, R. et al, :Mobile TDM/TDMA System With Active Array Antenna, Global Telecommunications Conference, 1991; Globecom '91, vol. 3, Dec. 2-5, 1991, pp. 1569-1573.

Chan, K. K., et. al, "A Circularly Polarized Waveguide Array for Leo Satellite Communications", Antennas and Propagation Society, 1999, IEEE International Symposium, vol. 1, Jul. 11-16, 1999, pp. 154-157.

Oodo, M., et. al, "Onboard DBF Antenna for Stratospheric Platform", 2000 IEEE International Conference on Phased Array Systems and Technology, Proceedings, May 21-25, 2000, pp. 125-128.

Chiba, Isamu et. al, "Digital Beam Forming (DBF) Antenna System for Mobile Communications", IEEE AES Systems Magazine, Sep. 1997, pp. 31-41.

Miura, Ryu et. al, "A DBF Self-Beam Steering Array Antenna for Mobile Satellite Applications Using Beam-Space Maximal-Ratio Combination", IEEE Trans. On Vehicular Technology, vol. 48, No. 3, May 1999, pp. 665-675.

Sakakibara, Kunio et. al, "A Two-Beam Slotted Leaky Waveguide Array for Mobile Reception of Dual-Polarization DBS", IEEE Transactions on Vehicular Technology, vol. 48, No. 1, Jan. 1999, pp. 1-7.

Sato, Kazuo et al., "Development And Field Experiments of Phased Array Antenna For Land Vehicle Satellite Communications", IEEE Antennas and Propagation Society International Symposium, 1992, Jul. 1992, pp. 1073-1076.

Yokosuka Research Park, "The First Stratospheric Platform Systems Workshop", May 12-13, 1999, pp. 1-216.

Casewell, I.E. , "The provision of GSM cellular radio environments within passenger aircraft operating over Europe", Rascal Res. Ltd., Walton-on-Thames, Mobile Radio and Personal Communications, 1989, Fifth International Conference, Dec. 11, 1989-Dec. 14, 1989, pp. 172-176.

U.S. Appl. No. 09/655,498, filed Sep. 5, 2000, Chang et al.

U.S. Appl. No. 09/611,753, filed Jul. 7, 2000, Chang et al.

Colella, Nicholas, "HALO Network—The Birth of Stratospheric Communications Services & the Decline of Satellite Networks", http://www.angelhalo.com/techpaper6, Copyright 1997-1999.

Djuknic, Goran et al., "Establishing Wireless Communications Services via High- Aeronautical platforms: A Concept Whose Time Has Come?" IEEE Communications Magazine, Sep. 1997, pp. 128-135.

Martin, James N. et al., "HALO Network—The Cone of Commerce", http://www.angelhalo.com/techpaper2, copyright 1997-1998.

Martin, James N. et al., "HALO Network—Broadband Wireless Services from High Altitude Long Operation (HALO) Aircraft", http://www.angelhalo.com/techpaper2, copyright 1997-1998.

Akyildiz, Ian F. et al., "HALO (High Altitude Long Operation): A Broadband Wireless Metropolitan Area Network", IEEE International Workshop on Mobile Multimedia Communications, Nov. 1999, pp/. 271-275.

Telecommunications: Glossary of Telecommunication Terms, Federal Standard 1037C, dated Aug. 7, 1996, http://www.its.bldrdoc.gov/fs-1037/dir-038/_5586.htm.

* cited by examiner

GEO STATIONARY COMMUNICATIONS SYSTEM WITH MINIMAL DELAY

This application is a continuation-in-part of application Ser. No. 09/539,964, filed Mar. 31, 2000.

BACKGROUND OF THE INVENTION

1. Field of the Invention

This invention relates in general to wireless communications systems, and in particular to a geo-stationary communications system with minimal delay.

2. Description of the Related Art

Communications satellites have become commonplace for use in many types of communications services, e.g., data trunking, voice communications, television broadcast, and other data transfer applications. As such, satellites transmit and receive large amounts of signals, used in either a "bent pipe" or "processing" payload configuration to transmit signals to desired geographic locations on the Earth's surface with multiple spot beams.

Because of the increase in satellite usage, the available resources on a given satellite have been completely utilized without providing enough bandwidth service to a desired geographic region. As such, users on the ground must either go without the satellite service, accept a reduced Quality of Service (QoS) for the satellite service, or timeshare the satellite service with other users, none of which are acceptable for users that require access to the satellite service at any given time. Further, the round-trip delay in communicating with satellites in geostationary (GEO) orbits approaches one half of a second, which can introduce data latencies that are troublesome in many applications. Mid-Earth orbit (MEO) and Low-Earth orbit (LEO) satellite constellations can provide improved performance over GEO satellite constellations, but these performance improvements are obtained at the expense of system complexity and cost.

It can be seen, then, that there is a need in the art for a communications system that provides high-speed and low latency access to the Internet and other terrestrial networks to a large number of users. The present invention satisfies that need

SUMMARY OF THE INVENTION

To overcome the limitations in the prior art described above, and to overcome other limitations that will become apparent upon reading and understanding the present specification, the present invention discloses a method for communicating and a communications system apparatus. The apparatus comprises a communications platform and a gateway communicatively coupleable with a terrestrially-based network. The communications platform is disposed in a stratospheric location and transponds information between at least one of a plurality of user terminals and the gateway in essentially a bent pipe fashion. The method comprises the steps of receiving a first signal from the user terminal having an antenna in a stratospherically-based communication platform that maintains an apparent position relative to the user terminal within a beamwidth of a user terminal antenna and transponding the first signal from the stratospherically based communications platform to a gateway ground station.

The present invention provides high-speed access to the Internet and other terrestrial networks through a wireless communication system. The present invention also provides high-speed access to such networks for a large number of densely populated users with minimal data latency.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
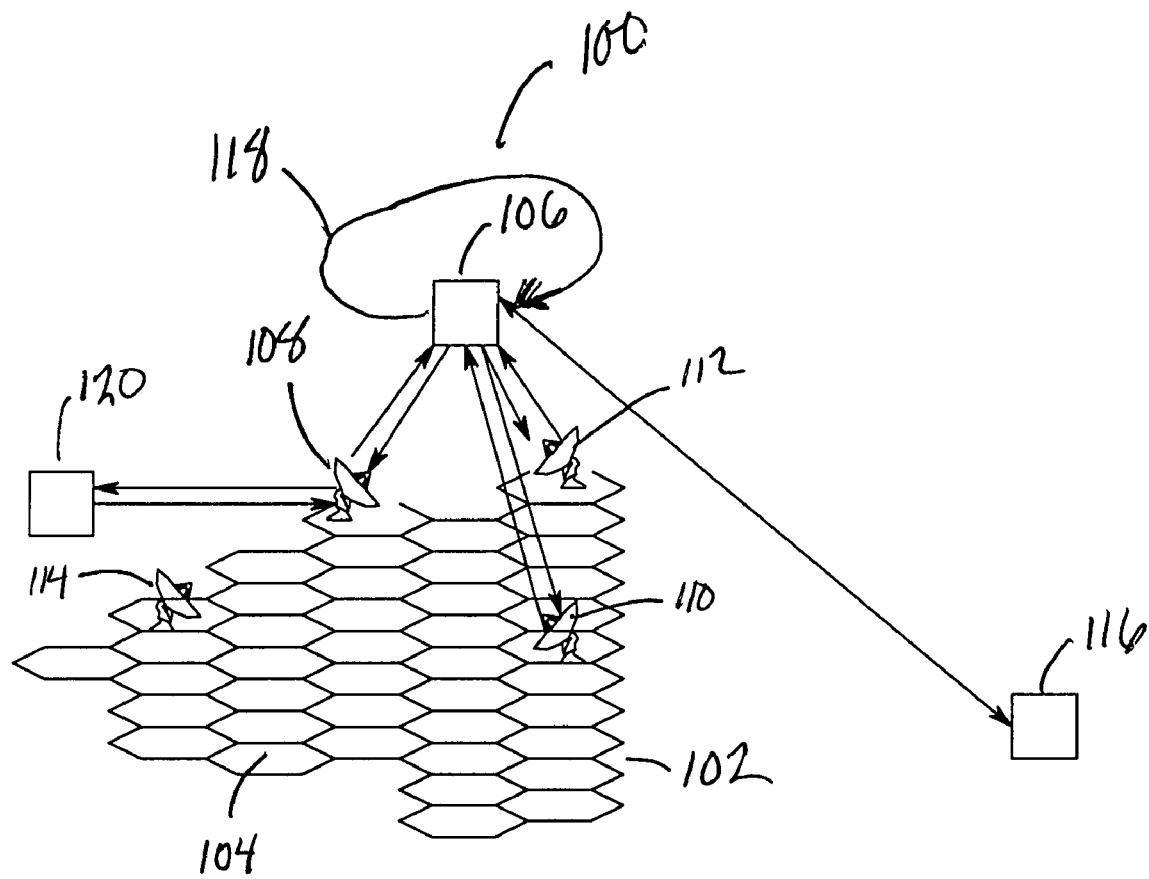
FIG. 1 illustrates a system diagram of one embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW OF RELATED ART

Communications systems have been enhanced through the use of satellite transmission links. Communications satellites are typically used in a "bent pipe" scenario, where the data is transmitted up ("uplinked") to the satellite from a ground station, and the satellite relays the uplink data down ("downlinks") to another geographically distant ground station. Communication satellites can also operate in a similar manner to cellular telephone systems, where the communication satellite provides spot beams to specific, distinct geographic locations. This allows for each location to receive different information if desired, e.g., one location can receive a local event for that region, while simultaneously, another location can receive a local event for that region. In addition, frequency resources can be reused in different beams.

However, communications satellites are typically deployed in GEO orbits, which place them at a distance of 35,788 kilometers (km) above the Earth's surface. Although electromagnetic signals travel at the speed of light, these signals must be uplinked from the ground station, be processed by the satellite, and be downlinked to another ground station and/or a user antenna. Since the distance between original transmission and final destination is 35,788 km times two (71,576 km), a significant delay in the system transit time is introduced. Such delays are especially noticeable in duplex communications systems. Further, satellite data throughput capabilities can be strained as more and more data is required in a geographic region.

The present invention minimizes the delay in the system by providing a shorter total communication path distance between the communicating entities (e.g. the users and the data sources). The present invention also reduces the projected beam size on the ground thus increasing "bandwidth/area." The present invention uses a "Geo-stationary" aeronautical platform that is suitable for microwave and other payloads similar to those used in satellite communications systems. Since the distance between the ground station and the platform is around twenty km, the delay between transmission and reception is reduced to less than 0.06% of that of a geosynchronous satellite transmission system.

To account for the fact that the apparent position of the aeronautical platforms are not entirely stationary over time, the user receiving antennae have sufficient beamwidth to circumscribe the apparent position of the aeronautical platforms transceiving information with the user terminals. This permits the use of low cost antennae systems that do not track the aeronautical platforms as they move about. The gateway antennas and the platform antennas on the other hand track each other to maximize the link availability.

Overview

It is difficult to provide high bandwidth wireless connectivity such as that which is needed with Internet and/or multimedia applications, from the beginning of a system directly to the terminals of end users. Geosynchronous (GEO) satellites are limited by bandwidth efficiency and tend to over serve unpopulated areas and under serve highly populated areas. Conventional middle earth orbit (MEO) and low earth orbit (LEO) satellites are complex in nature and since their apparent position is not stationary over time, the user terminals are required to track the satellites. Further, conventional MEO/LEO systems require data management and data switching techniques between satellites as the satellites pass over geographic service regions. Terrestrial systems are limited by the infrastructure deployment rate and cost.

The present invention can be deployed quickly, is scaleable to markets and market sizes, and can be serviced and upgraded with new technology. The present invention can also be developed to serve transportable and/or mobile users.

FIG. 1 illustrates a system diagram of one embodiment of the present invention.

FIG. 1 illustrates system 100, which has a cellular pattern 102 that defines geographic locations on the Earth's surface. The edges of the cells 104 are not physical boundaries within the cellular pattern 102; each cell 104 represents a geographic area that can receive a signal with a predetermined signal strength or receives a antenna radiation spot in a spot beam pattern that is available from and provided by platform 106.

Platform 106 communicates with gateway antenna 108, user terminals 110–114, and control station 116. Each communication link between platform 106 and gateway antenna 108, user terminals 110–114, and control station 116 provides information to platform 106 and/or the gateway antenna 108, user terminals 110–114, and/or control station 116 as described below.

Platform 106 is a stratosphere-based platform that remains substantially stationary relative to a geographic region on the Earth. Hence, its apparent location in the sky, when viewed from the ground, remains substantially stationary as well. The platform 106 is controlled by control station 116 to fly in a small radius flight path 118, typically a circle, but can also be ellipsoidal or otherwise shaped, over a given spot on the Earth. Each platform 106 is used as a communications node for one or more gateway antennae 108 and one or more user terminals 110–114 antennae that are pointed in the direction of the platform.

In one embodiment, each of the user terminals 110–114 includes a mechanically or electrically steerable antenna to follow the platform 106 throughout the flight path 118. In another embodiment, the shape and dimensions of the beamwidth of the user terminal 110–114 antennae are such that the apparent position of the platform 106 on the flight path 118 remains within the beamwidth of the user terminal 110–114 antennae.

In this embodiment, the user terminal 110–114 antennae beamwidth is sufficient to maintain communications links with the platform 106 throughout the flight path 118 without the use of mechanical or electronic steering. The shape and dimension of the user terminal 110–114 antennae beamwidth can be matched to the shape of the flight path 118, if desired. The gateway 108 antennae are typically mechanically or electronically steerable to track the platforms 106 throughout the flight path 118.

Gateway 108 is also communicatively coupled to terrestrial network 120, which may include a connection to the Internet or another terrestrial network via land-based lines. This gives user terminals 110–114 access to the network 120 without having a direct connection through a server, as well as avoiding multiple servers, routers, etc. that may be physically between user terminals 110–114 and terrestrial network 120, thus increasing communications performance.

Ground station 116 acts as a control station for controlling one or more platforms 106 throughout system 100. Ground station 116 provides control functions, such as attitude control, altitude management, and coordination of replacement of parts and/or platforms 106 throughout system 100. Ground station 116 may also determine when and if a specific platform 106 needs repair, replacement, or maintenance functions performed, by monitoring the status of one or more platforms 106 in system 100.

The antennas and payloads used by the platform 106 and the user terminal antennas 110–114, as well as the gateways 108, allow for large data throughput in the present invention. Since there is a shorter physical distance between user terminals 110–114 and data sources, e.g., other user terminals 110–114, data warehouses, etc., the system 100 allows for users to access large amounts of data at a large rate, because the user can now be allocated system resources directly to the platform 106, that can be reused for users in other geographic areas.

Since all communications traffic go through the gateway 108 in a hub and spoke network, user terminal 110 can access data from a data warehouse connected to network 120 through platform 106 and gateway 108, without having to go through a local server, local router, and other physical hardware that may delay the delivery of data through network 120 to user terminal 110. Further, this allows user terminal 110 access to network 120, and other data sources connected to network 120, without regard to other local and/or geographically distant users, because of the direct connection that user terminal 110 has with platform 106. The gateway 108 also provides direct connectivity between user terminals.

System Architecture

The platforms 106 are maintained in the desired location. This can be accomplished with the use of aerodynamic control, or by other techniques. Payload modules on the platform 106, which include transmit and/or receiving antennae on the platform 106 are decoupled from the platform 106 motions with gimbals or other decoupling techniques. The platform 106, platform communication antennae, and user terminal 110–114 antennae are designed to accommodate platform 106 station keeping dynamics. The platform 106 motion envelope is small relative to the projected beam size 104 on the ground.

The user data is processed through the gateway 108. The platforms 106 are deployed at a nominal altitude of approximately 20 kilometers. Since the platforms 106 are at such a low altitude compared with the 35,788 kilometer orbit for geosynchronous satellites, the communication system 100 has a delay latency equivalent or better than terrestrial networks for the same geographic area.

The system 100 can also use frequency, polarization and/or spatial diversities to bring bandwidth density efficiently to as high as 222 MHz/kilometer2 into highly populated urban areas. The closely packed spatial diversity is analogous to orbital slots for geosynchronous satellites but is applied in two dimensions, which also allows competing systems to exist.

When the system operates at the Ka band frequency, the nominal station keeping requirement for the platform 106 is that the platform 106 should stay within a 600 meter turning radius and a ±30 meter vertical altitude over all environment conditions. This allows for the user terminals 110–114 on the ground to use antennas that have beamwidths wide enough to maintain contact with the platform 106 without tracking the platform 106, as would be required in Low Earth Orbit (LEO) and Middle Earth Orbit (MEO) satellite constellations. The command center 116 controls the platforms 106, and provides, when necessary, spare platforms 106 to ensure a high rate of overall system availability, typically 99.9%.

The communications payload on the platform 106 can be a simple transponder design connecting the user terminals 110–114 to the gateways 108, and can also be a more complex communications system design. To achieve the bandwidth density on the user terminal 110–114 links, the multibeams are arranged in a conventional four-cell reuse configuration, but other reuse configurations can be utilized with the present invention.

The cell 104 size can be combined with encoding schemes, such as Code Division Multiple Access (CDMA), Time Division Multiple Access (TDMA), Frequency Division Multiple Access (FDMA), or combinations of these schemes, to overcome the interference caused by the worst case platform motions. Further, the user terminal 110–114 links can be designed for any frequency band, including Ka- and Ku-bands.

Figure 2:
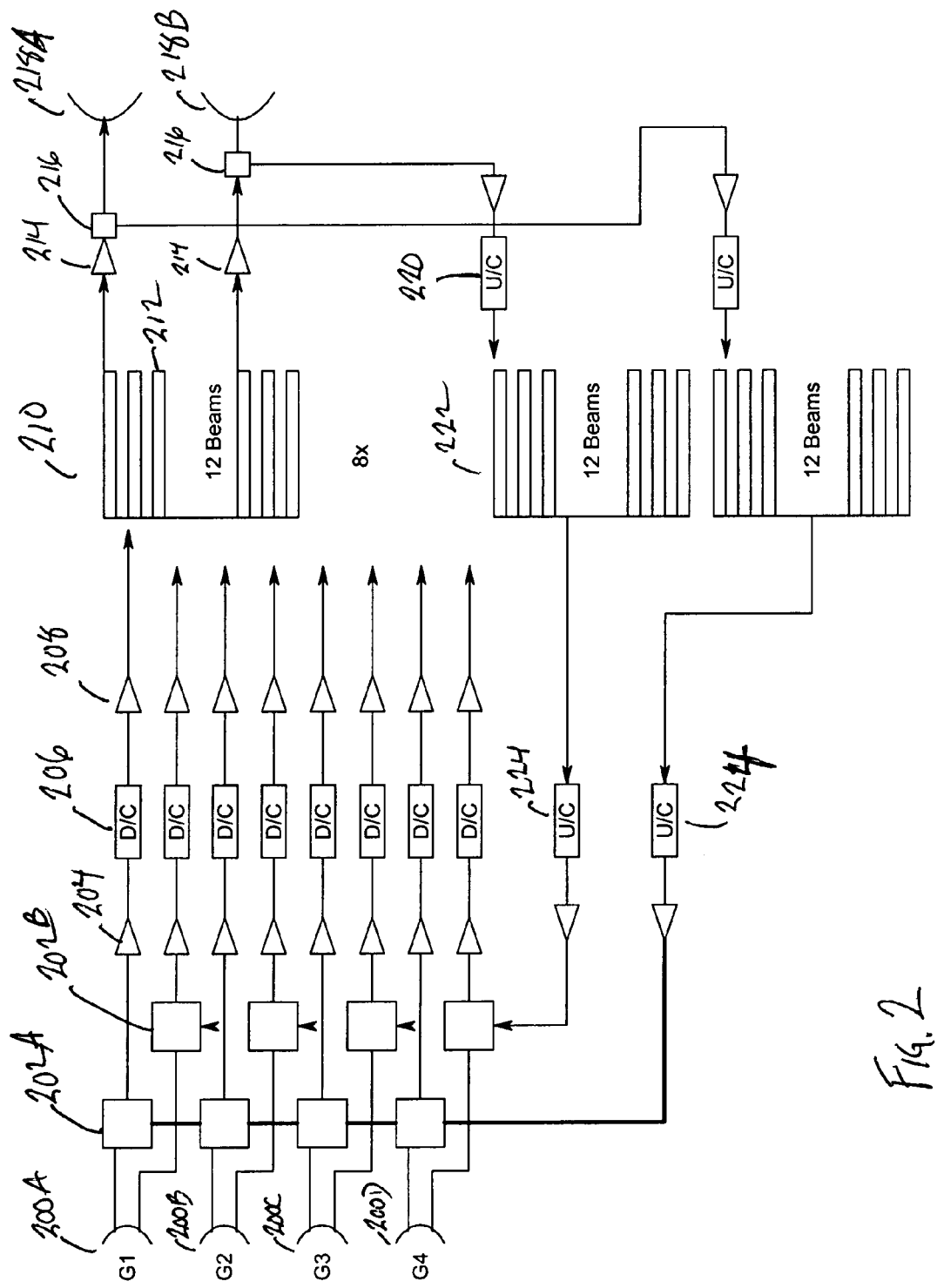
FIG. 2 illustrates a typical payload block diagram used with the present invention.

FIG. 2 illustrates a block diagram of a typical payload used with the present invention.

The block diagram shows one embodiment that implements the payload in a transponder configuration. The antennae 200A–200D act as transmit and receive antennas for platform 106 to/from gateway 108. Each antenna 200A–200D is coupled to diplexers 202 and amplifiers 204. The signals received by the antennas 200A–200D are downconverted using downconverters 206, and the downconverted signals are amplified by amplifiers 208. Each signal is then separated into sub-bands 210 and the sub-bands 210 are further divided into user signals 212. The user signals 212 are then sent through an amplifier 214 and diplexer 216 to user antennas 218A–218B for transmission to user terminals 110–114.

The return link signals from the user terminals 110–114 are received at user antennas 218A–218B, and diplexed through diplexers 216 to an upconverter 220. Each signal is combined in combiner 222, where twelve user signals are combined in much the same fashion as they are separated into subbands 210. The signals are upconverted again at upconverter 224, and sent back to gateway 108 via antennas 200A–200D.

The bandwidth assigned to each of the beams can support a variety of multiple access techniques, including combinations of frequency division/time division multiple access (FDM/TDMA) techniques and frequency division/code division multiple access (FDM/CDMA) techniques. The packet size, code length, and other parameters for these techniques can be optimized for system throughput performance.

The available bandwidth of the signal received by a single gateway antenna 200A–200D is typically 500 MHz in each polarization, which is divided into two 250 MHz subbands. Each 250 MHz subband supports twelve user signals 212, and there are eight subbands, therefore, the platform 106 payload can support 96 user signals 212. This configuration can achieve a bandwidth of 6 MHz/km2 if the corresponding cell 104 size is 8 km hexagonal.

Gateway Characteristics

Figure 4:
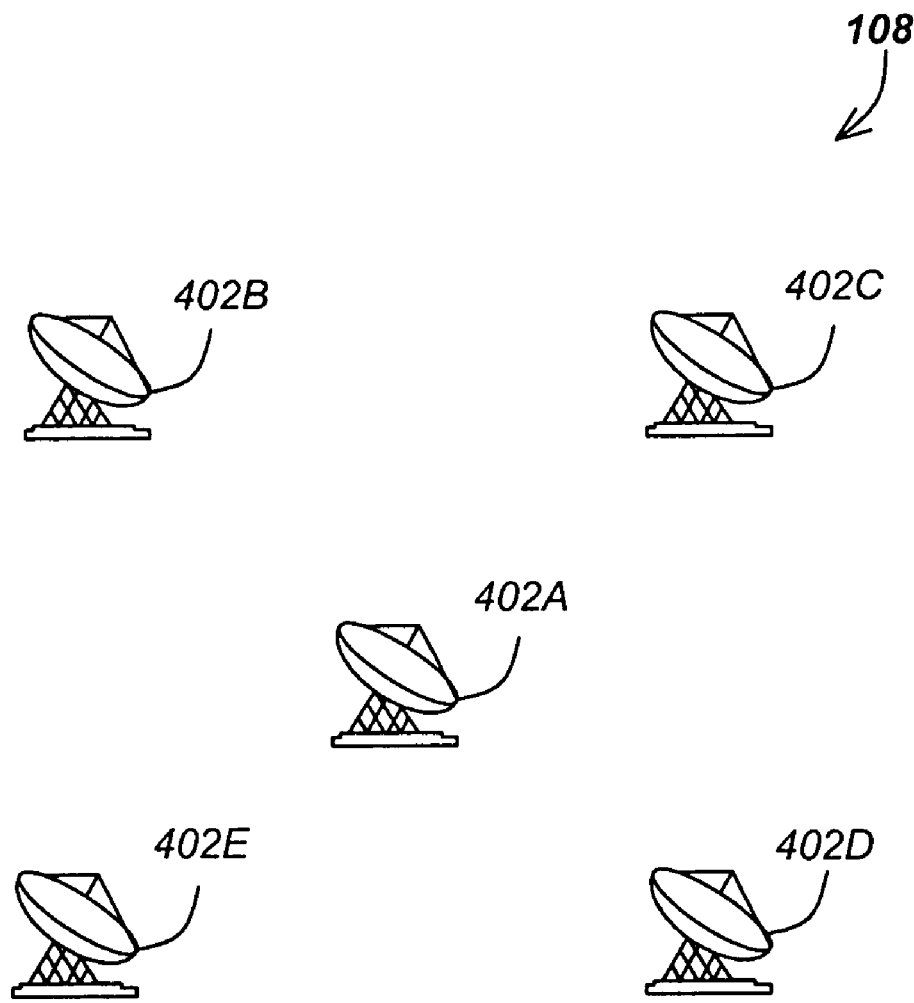
FIG. 4 is a diagram of a gateway showing a plurality of gateway antennae.

FIG. 4 is a diagram of one embodiment of the gateway 108 antenna configuration.

The gateway 108 uses high frequency communications links, typically a 92–95 GHz uplink to the platform 106 and an 81–84 GHz downlink signal from the platform 106 to the gateway 108. The selection of W band for the gateway 108 has several advantages. First, the large bandwidth allows all user bandwidths be transponded to the gateway thus eliminates processing payload. Second, the higher frequency is near a minimum rain attenuation over the frequency spectrum. Third, the inherent small antenna beamwidth allows close proximity of multiple gateway antennas to serve each platform. The frequency bands within the uplink and downlink signals are polarization reused for each of the gateway 108 antenna in the system 100.

The gateways 108 are spatially separated and can use autotracking antennas to maximize data throughput to the platforms 106. Each gateway 108 may includes a plurality of gateway 108 antennae 402A–402E, each separated by a distance sufficient to assure spatial diversity. In one embodiment, the gateway 108 antennae include a center antenna 402A and four peripheral antennae 402B–402E, each approximately 200 meters distant from the center antenna, and approximately 283 meters from each other. This distance permits the use of spatial diversity to permit frequency re-use.

By using a polarization/spatial diversity reuse schema, a reuse factor of eight can be achieved with a minimum of 4 gateway antennas, which yields a per-platform 106 bandwidth throughput of 24 GHz. The gateways 108 process and route the user data either externally through terrestrial networks 120, or other networks such as satellite networks, or can route data to the platform 106 directly to the user terminals 110–114 within the coverage area 102. The gateway 108 links can also use cross-polarization cancellation techniques to maintain link performance over the worst case weather scenarios, e.g., rain. Or the number of antennas and reuse factor can be optimized.

User Terminal Characteristics

The user terminal 110–114 antenna should have a sufficient beamwidth to accommodate the platform 106 flight path 118, e.g., used for station keeping. Simultaneously, the beamwidth of the user terminal 110–114 must be narrow enough to allow multiple platforms 106 to operate over the same coverage area 102 to further increase the bandwidth density if demand rises. Corresponding to the FIG. 2 payload at Ka band, 30 cm diameter antennas can be used for cells 104 directly underneath the platform 106, and 45 cm diameter antennas are required for cells 104 at the fringe of the coverage area to maintain communications links for the nominal E1 (2.048 MBPS) data rate.

Figure 3:
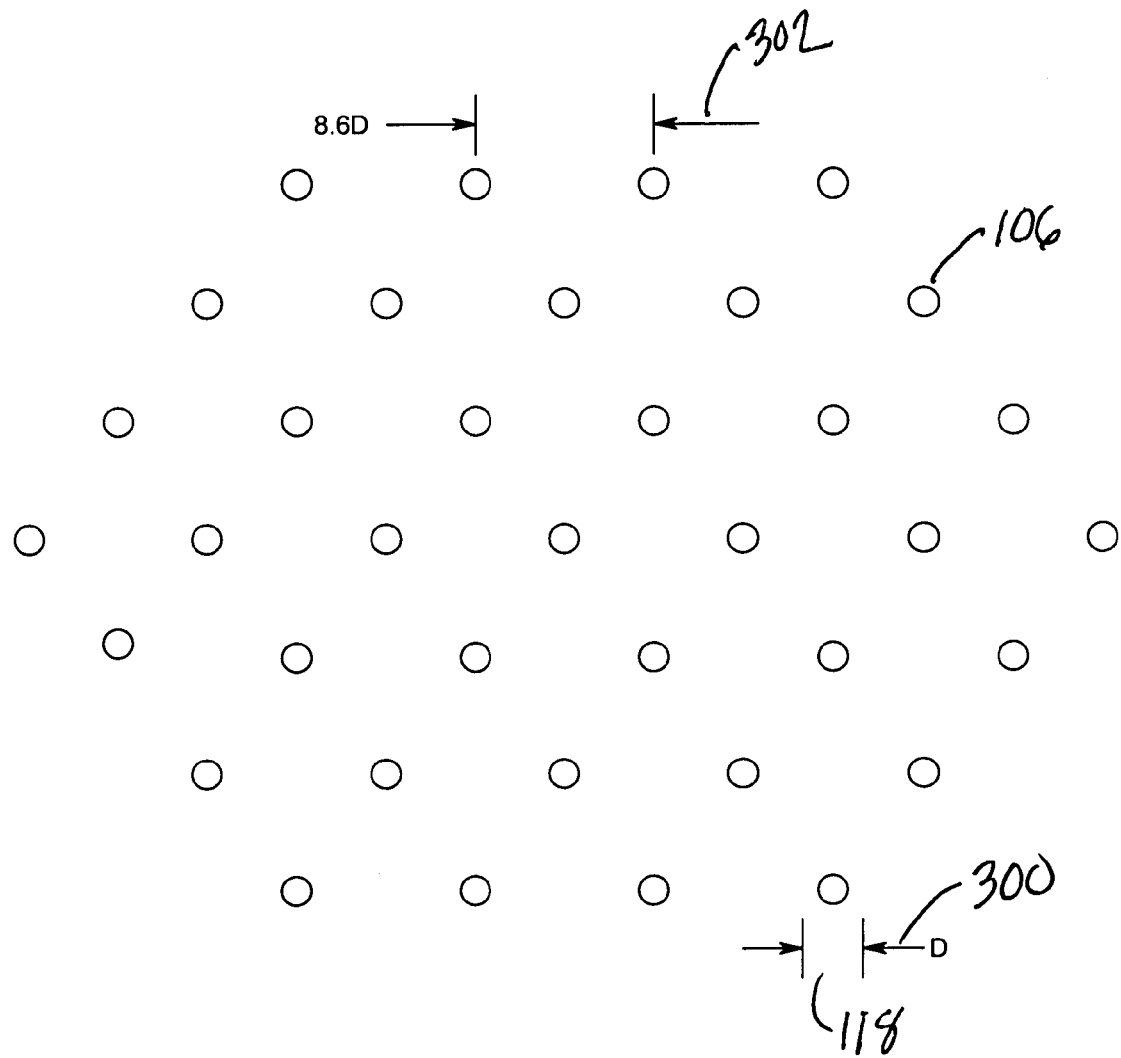
FIG. 3 illustrates a typical platform configuration used with the present invention.

The sidelobe level for these user terminal 110–114 antennas at Ka-band allows hexagonal packing of 37 platforms 106 as shown in FIG. 3 with minimum mutual interference. Each platform travels on flight path 118 that has a diameter D 300, where D is nominally 1200 meter if the system operates at Ka band. The distance 302 between platforms is 8.6 times D. This configuration increases bandwidth density in the overlapping region to 222 MHz/km2.

System Optimization

The system of the present invention can be scaled and optimized in many ways when deployed over various markets. The payload can be designed in increments of 6 GHz throughput corresponding to a single gateway 108 antenna. The antenna beams can be selectively populated to cover necessary cells 104. The payload can be upgraded and reconfigured when platforms 106 are retrieved for maintenance. The platform 106 can be optimized for tighter station keeping with smaller payloads. Correspondingly the cell 104 size can be reduced for higher bandwidth density. In turn, the overall system 100 capacity can be maintained with multiple platforms 106 over a coverage area 102.

Process

Figure 5:
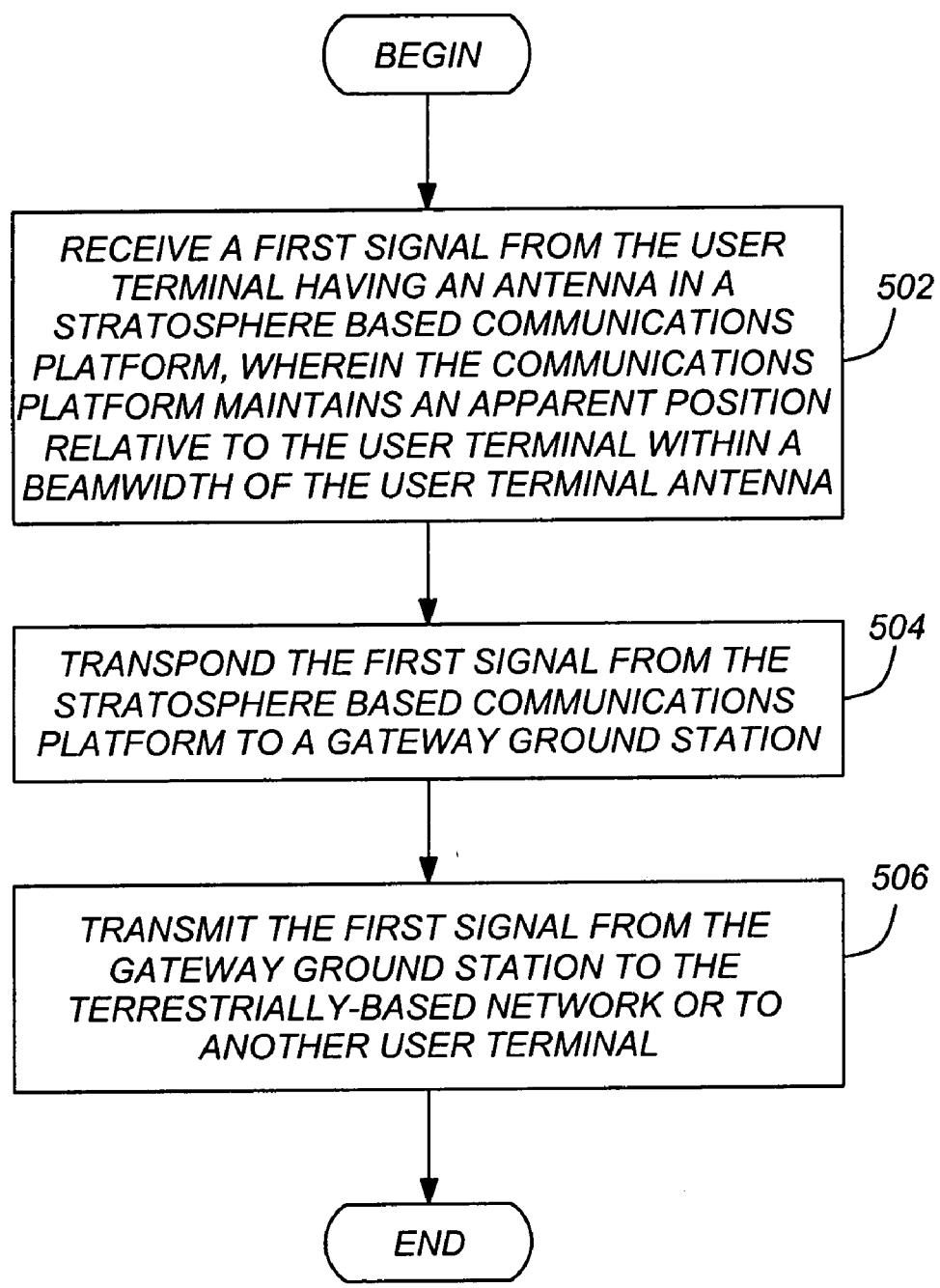
FIG. 5 is a flow chart illustrating exemplary steps used to practice the present invention.

FIG. 5 is a flow chart illustrating exemplary steps used to practice the present invention.

Block 502 illustrates the step of receiving a first signal from the user terminal 110 having an antenna in a stratosphere-based communications platform 106, wherein the communications platform 106 maintains an apparent position relative to the user terminal 110 within a beamwidth of the user terminal antenna.

Block 504 illustrates performing the step of transponding the first signal from the stratosphere based communications platform 106 to a gateway 108 ground station.

Block 506 illustrates performing the step of transmitting the first signal from the gateway ground station 108 to the terrestrial based network 120 or to another user terminal 110.

CONCLUSION

This concludes the description of the preferred embodiment of the invention. The following paragraphs describe some alternative methods of accomplishing the same objects. The present invention, although described with respect to RF and electrical systems, can also be used with optical systems to accomplish the same goals. Further, the platforms may be stationed at different altitudes, have different packing densities, or use different payloads to accomplish substantially the same functions as described herein.

In summary, the present invention discloses a method for communicating and a communications system apparatus. The apparatus comprises a communications platform, user terminals and a gateway. The communications platform is located in a stratospheric location and communicates directly with a user terminal, receiving information from the user terminal and transmitting information to the user terminal. The gateway communicates with the communications platform and couples the user terminal with a terrestrial-based network through the communications platform. The communications system apparatus can be replicated in the densely populated area to increase total throughput.

In one embodiment, the method comprises sending full duplex signal from the user terminal to a stratosphere-based communications platform, transmitting the full duplex signal from the stratosphere-based communications platform to a gateway ground station, and transmitting the full duplex signal from the gateway ground station to the terrestrial based network.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A communications system, comprising:
a gateway, communicatively coupleable to a terrestrially-based network;
a plurality of communications platforms, each of the plurality of communications platforms disposed in a stratospheric location, for transponding information between at least one of a plurality of user terminals and the gateway, wherein the plurality of communications platforms travels on a path having a radius D and wherein a distance between each platform is approximately 8.6 D.

2. The communications system of claim 1, wherein the gateway aggregates all data traffic comprising the information between the plurality of user terminals.

3. The communications system of claim 1, wherein the gateway aggregates all data traffic comprising the information between each of the user terminals and the terrestrially-based network.

4. The communications system of claim 1, wherein:
the user terminal includes an unsteered user terminal antenna characterizable by a beamwidth; and
the communications platform maintains an apparent position relative to the user terminal within the beamwidth of the user terminal antenna.

5. The communications system of claim 1, wherein the system comprises more than one communications platform.

6. The communications system of claim 5, wherein the gateway directly communicates with more than one communications platform.

7. The communications system of claim 6, wherein the user terminal communicates with only one communications platform.

8. The communications system of claim 1, wherein the user terminal communicates with the communications platform in a first frequency band, and the communications platform communicates with the gateway in a second frequency band.

9. The communications system of claim 1, wherein the stratospheric location of the communications platform is within a predetermined distance of the user terminal to maintain communications between the communications platform and the user terminal.

10. The communications system of claim 1, wherein the gateway comprises a plurality of gateway antennae, separated from each other by a distance sufficient to provide spatial diversity in communicating with the communications platform.

11. The communications system of claim 10, wherein the user terminals communicate with the communications platform using a communication diversity selected from the group comprising:
  spatial diversity; and
  polarization diversity.

12. The communications system of claim 1, wherein the system comprises at least two communication platforms in overlapping positions.

13. The communications system of claim 1, wherein each user terminal is associated with a cell and user terminals in overlapping cells communicate with different communications platforms through spatial diversity.

14. The communication system of claim 1, wherein the information is transponded according to a coding technique selected from the group comprising time division multiple access (TDMA) and code division multiple access (CDMA).

15. The communications system of claim 1, wherein the communications platforms are hexagonally packed.

16. A communications signal, generated by performing the steps of:
  receiving a first signal from a user terminal having a user terminal antenna in one of a plurality of stratosphere-based communications platforms travelling on a path having a radius D and wherein a distance between each platform is approximately 8.6 D, wherein the communications platform maintains an apparent position relative to the user terminal within a beamwidth of the user terminal antenna; and
  transponding the first signal from the one of the stratosphere-based communications platforms to a gateway ground station.

17. The signal of claim 16, wherein the terrestrially-based network is the Internet.

18. The signal of claim 16, wherein the first signal is transmitted in one of a plurality of beams to the gateway ground station having a plurality of antennae disposed to provide spatial diversity among each of the plurality of beams.

19. The communications signal of claim 16, wherein the communications platforms are hexagonally packed.

20. A method for communicating from a user terminal, comprising:
  receiving a first signal from the user teal having an antenna in one of a plurality of stratosphere-based communications platforms travelling on a path having a radius D and wherein a distance between each platform is approximately 8.6 D, wherein the communications platform maintains an apparent position relative to the user terminal within a beamwidth of a user terminal antenna; and
  transponding the first signal from the one of the stratosphere-based communications platforms to a gateway ground station.

21. The method of claim 20, further comprising the steps of:
  receiving the first signal from the gateway ground station in the communications platform; and
  transponding the first signal from the communications platform to a second user terminal.

22. The method of claim 20, further comprising the steps of:
  transmitting the first signal from the gateway ground station to the terrestrially-based network.

23. The method of claim 22, wherein the terrestrially-based network is the Internet.

24. The method of claim 20, wherein the first signal is transponded by one of a plurality of beams to the gateway ground station having a plurality of antennae disposed to provide spatial diversity among each of the plurality of beams.

25. The method of claim 20, wherein the communications platforms are hexagonally packed.

26. A communications system, comprising:
  a user terminal for transmitting and receiving data through a terrestrial-based network; and
  wherein the user terminal communicates with a gateway via a stratospheric-based communications platform transponder disposed on one of a plurality of communications platforms traveling on a path having a radius D and wherein a distance between each platform is approximately 8.6 D.

27. The communications system of claim 26, wherein:
  the user terminal includes an unsteered user terminal antenna characterizable by a beamwidth; and
  the communications platform maintains an apparent position relative to the user terminal within the beamwidth of the user terminal antenna.

28. The communications system of claim 26, wherein the user terminal communicates with the communications platform in a first frequency band, and the communications platform communicates with the gateway in a second frequency band.

29. The communications system of claim 26, wherein the gateway comprises a plurality of gateway antennae, separated from each other by a distance sufficient to provide spatial diversity in communicating with the communications platform.

30. The communications system of claim 29, wherein the distance is at least 200 meters.

31. The communications system of claim 26, wherein the communications platforms are hexagonally packed.

32. A communications system, comprising:
  a plurality of communications platforms, each of the communications platforms being located in a substantially geostationary stratospheric location and travelling on a path having a radius D and wherein a distance between each platform is approximately 8.6 D, the communications platform having a transponder for communicating directly with a user terminal, for receiving information from the user terminal and for transmitting information to the user terminal; and
  a gateway, communicating with the one of the plurality of communications platforms, for coupling the user terminal with a terrestrial-based network through the communications platform.

33. The communications system of claim 32, wherein the system comprises more than one communications platform.

34. The communications system of claim 33, wherein the gateway communicates with more than one communications platform.

35. The communications system of claim 34, wherein the user terminal communicates with only one communications platform.

36. The communications system of claim 32, wherein the user terminal communicates with the communications platform in a first frequency band, and the communications platform communicates with the gateway in a second frequency band.

37. The communications system of claim 32, wherein the stratospheric location of the communications platform is within a predetermined distance of the user terminal to maintain communications between the communications platform and the user terminal.

38. The communications system of claim 32, wherein:
the user terminal includes a user terminal antenna characterizable an untrackable beamwidth; and
the communications platform stays within the beamwidth of the user terminal antenna.

39. The communications system of claim 32, wherein the communications platforms are hexagonally packed.

40. A communications signal, generated by performing the steps of:
sending a first signal from the user terminal to one of a plurality of stratosphere-based substantially geostationary communications platforms, each traveling on a path having a radius D and each distant from a neighboring platform by approximately 8.6 D;
transponding the first signal from the one of the plurality of substantially geostationary stratosphere-based communications platform to a gateway ground station; and
transmitting the first signal from the gateway ground station to the terrestrial based network.

41. The communications signal of claim 40, wherein the first signal is transmitted from the user terminal to the stratosphere-based substantially geostationary communications platform by a user terminal antenna characterizable by an untrackable beamwidth, and the communications platform stays within the beamwidth of the user terminal antenna.

42. The communications signal of claim 40, wherein the communications platforms are hexagonally packed.

43. A method for communicating between a user terminal and a terrestrial-based network, comprising:
sending a first signal from the user terminal to one of a plurality of substantially stationary stratosphere-based communications platforms, each traveling on a path living a radius D and each distant from a neighboring platform by approximately 8.6 D;
transponding the first signal from the one of the substantially stationary stratosphere-based communications platform to a gateway ground station; and
transmitting the first signal from the gateway ground station to the terrestrial based network.

44. The method of claim 43, wherein the first signal is sent from the user terminal to the stratosphere-based substantially geostationary communications platform by a user terminal antenna characterizable by an untrackable beamwidth, and the communications platform stays within the beamwidth of the user terminal antenna.

45. The method of claim 43, wherein the communications platforms are hexagonally packed.

46. A communications system, comprising:
a user terminal for transmitting and receiving data through a terrestrial-based network, wherein the user the communicates directly with a transponder on one of a plurality of communications platforms located in a substantially geostationary stratospheric location, each of the platforms traveling on a path having a radius D and each distant from a neighboring platform by approximately 8.6 D; and
a gateway, communicating with the communications platform, for communicatively coupling the terrestrial based network to the user terminal through the communications platform.

47. The communications system of claim 46, wherein the user terminal comprises a user terminal antenna characterizable by an untrackable beamwidth, and the communications platform stays within the beamwidth of the user terminal antenna.

48. The communications system of claim 46, wherein the communications platforms are hexagonally packed.

* * * * *